June 3, 1952　　　　T. F. HAMILTON　　　　2,599,173
DISPENSING APPARATUS
Filed May 3, 1944　　　　　　　　　　　　10 Sheets-Sheet 2
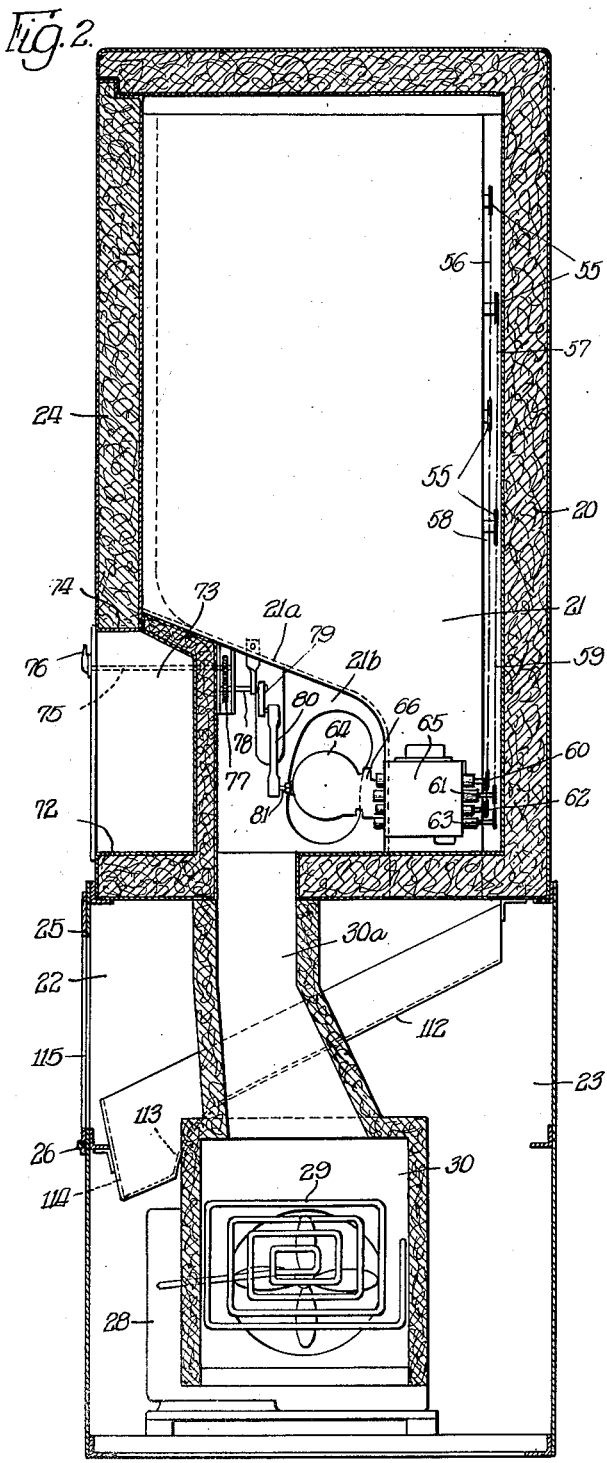
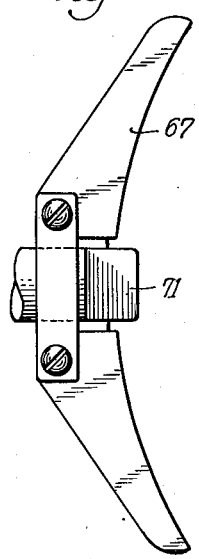
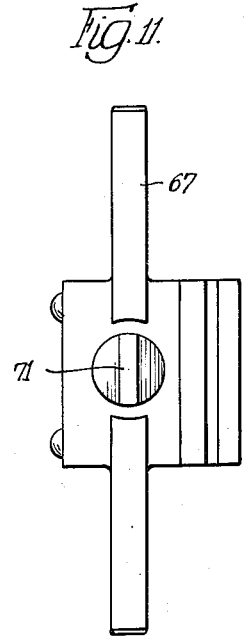
Inventor:
Thomas F. Hamilton,

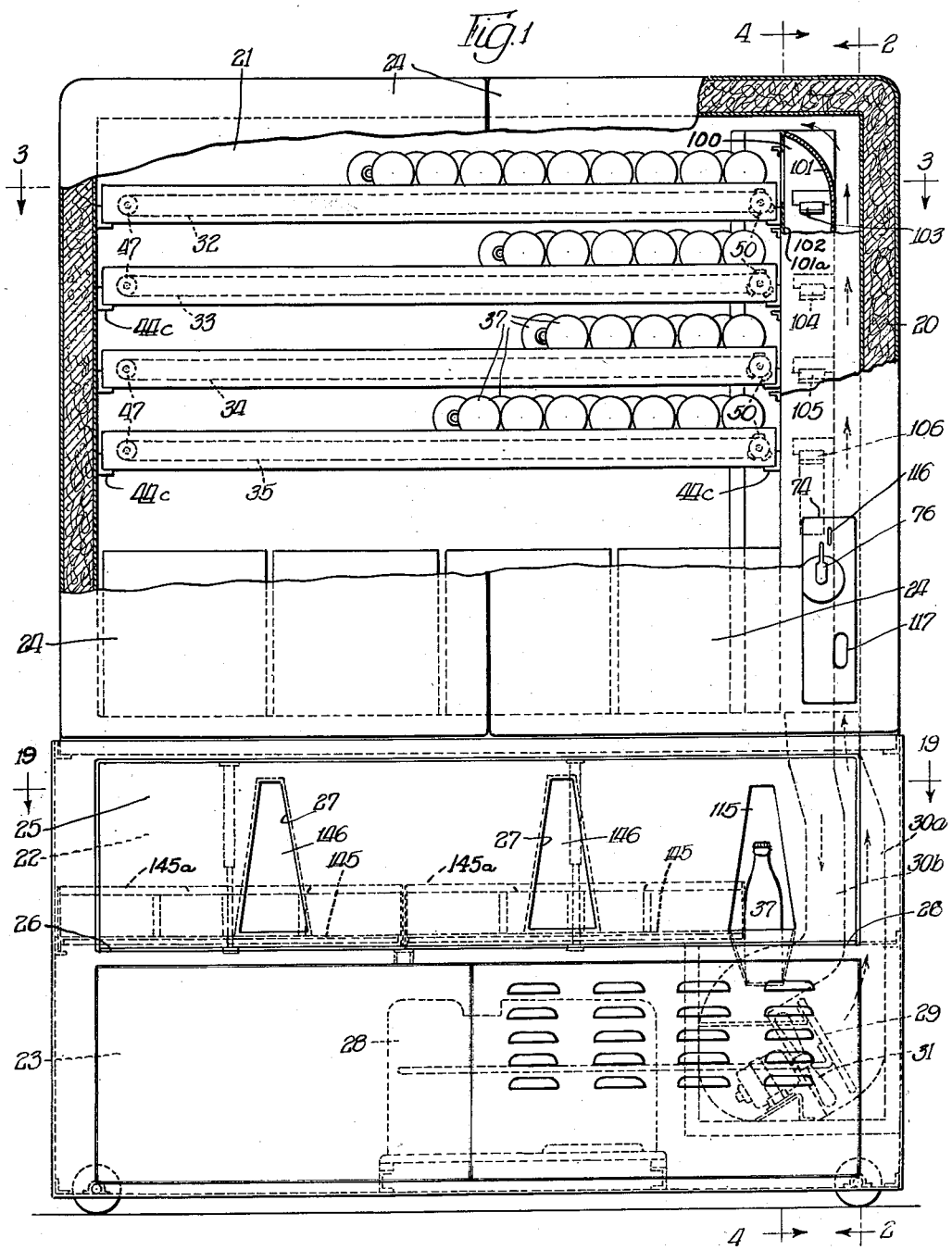

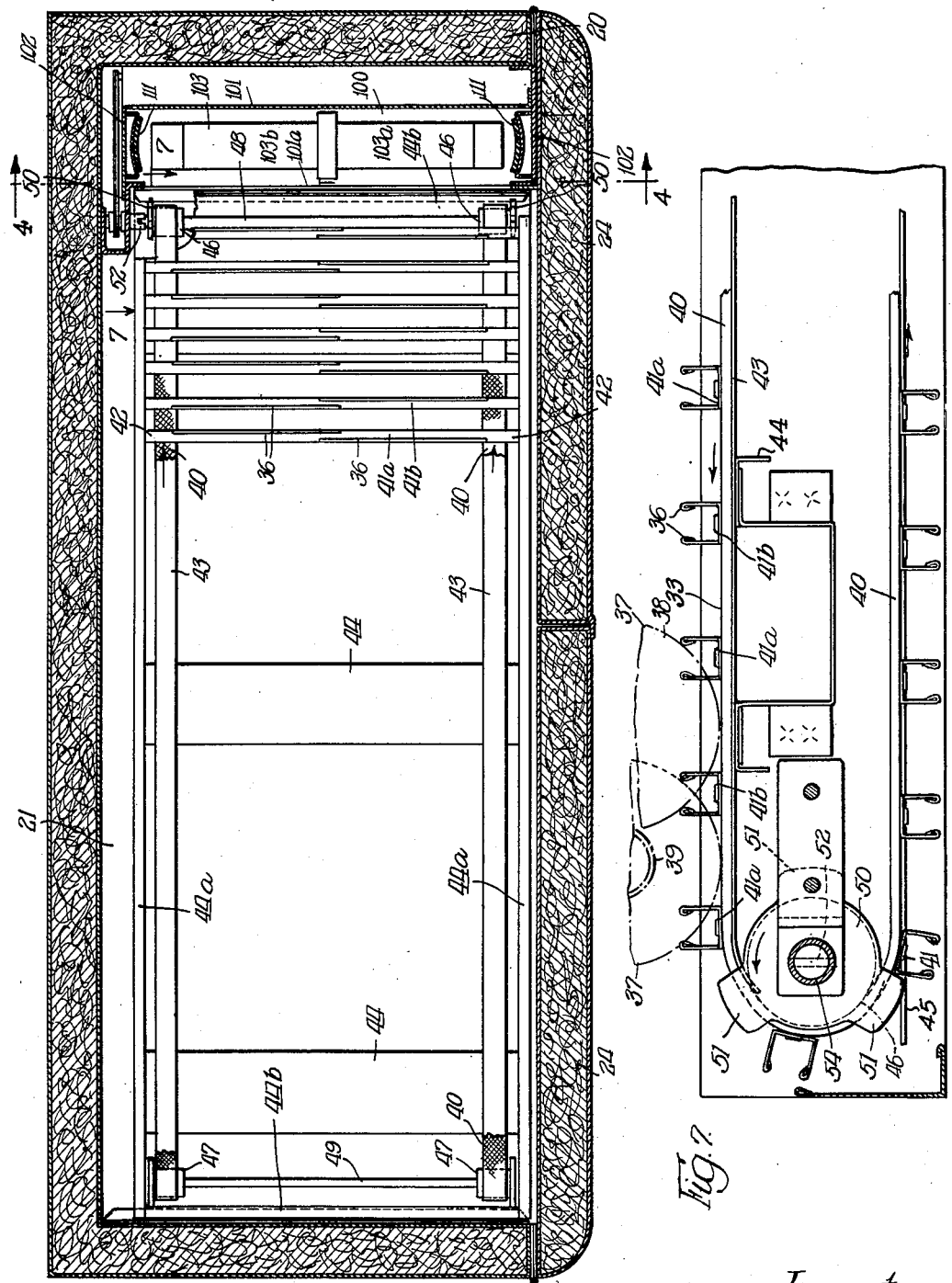

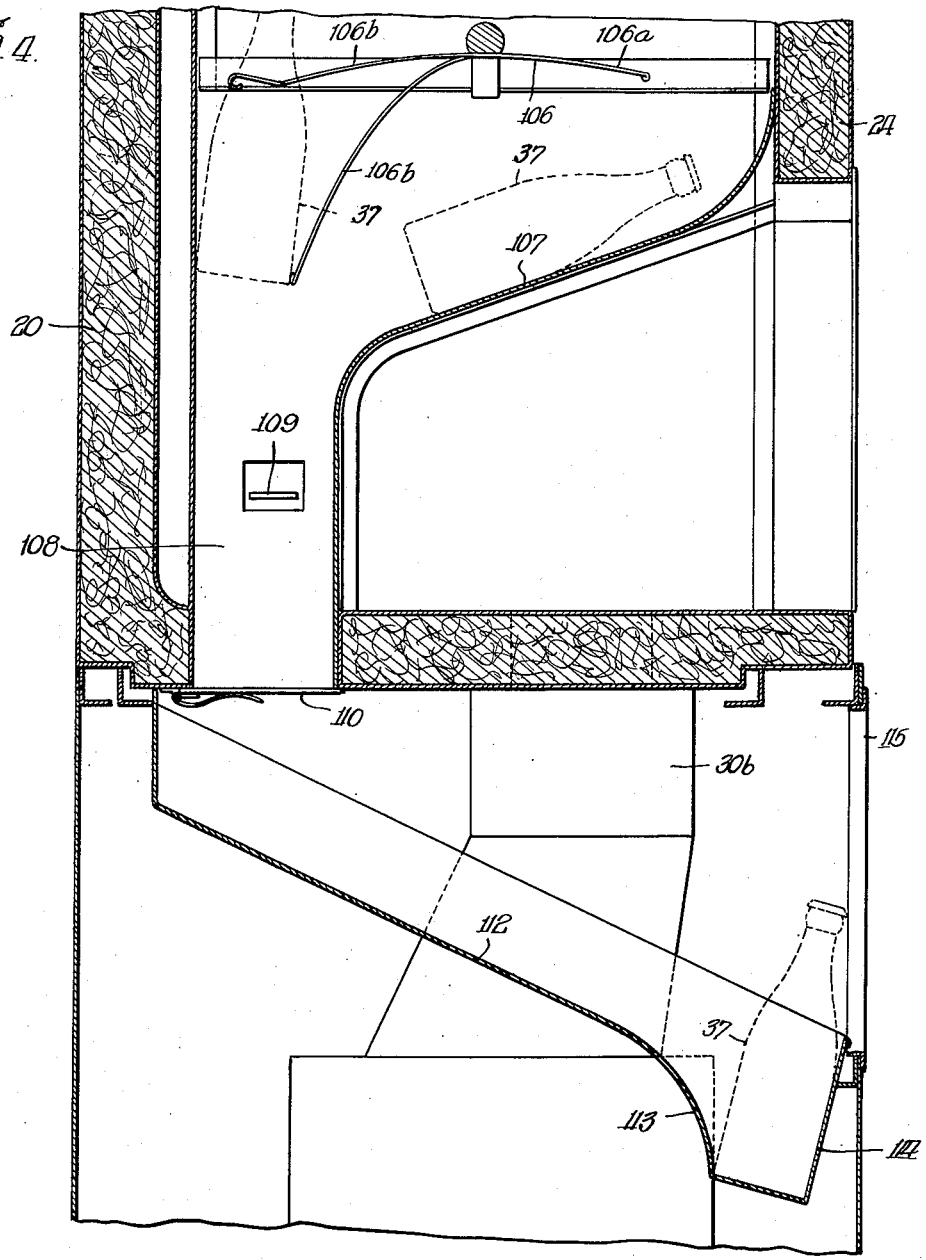

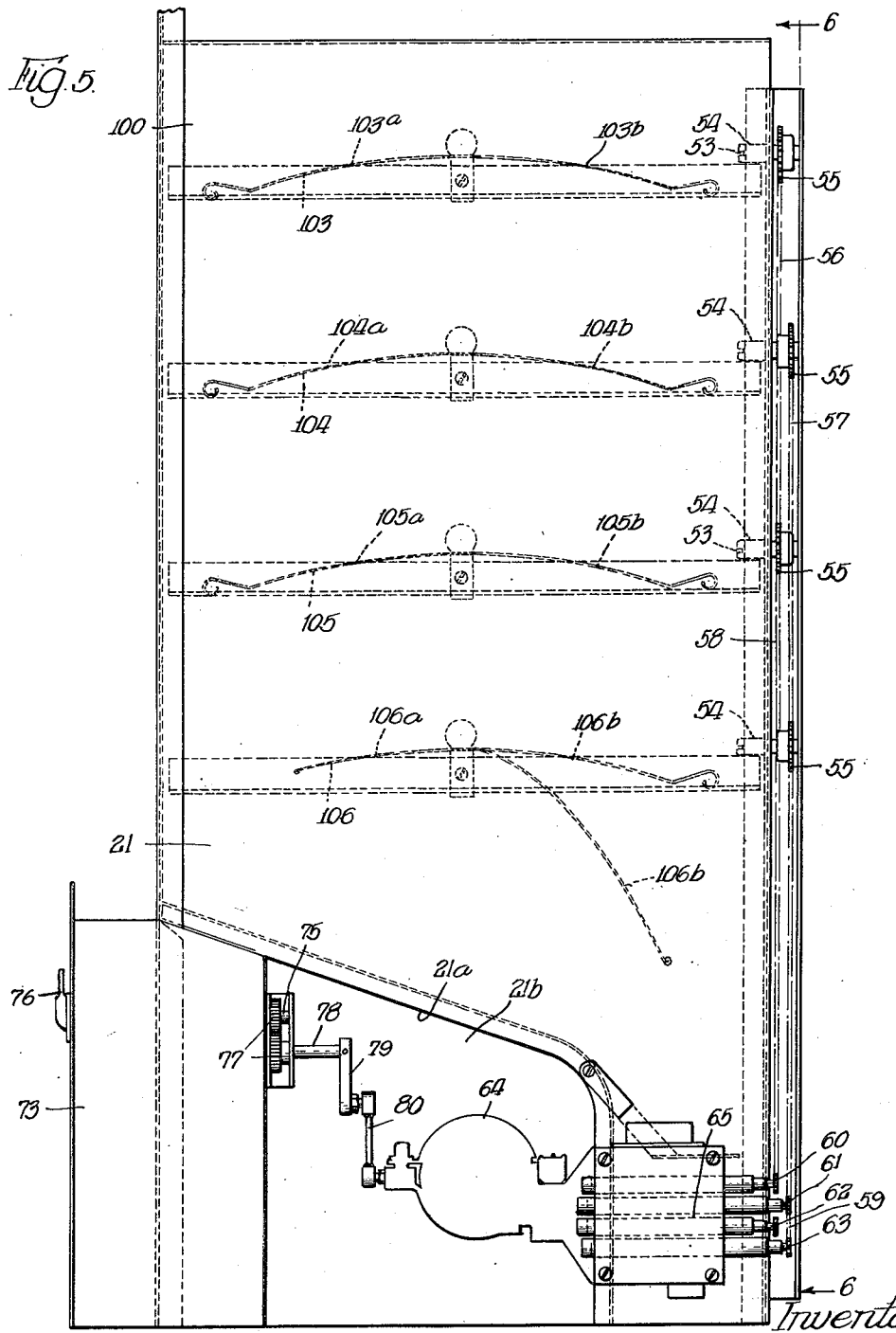

June 3, 1952 T. F. HAMILTON 2,599,173
DISPENSING APPARATUS
Filed May 3, 1944 10 Sheets-Sheet 6
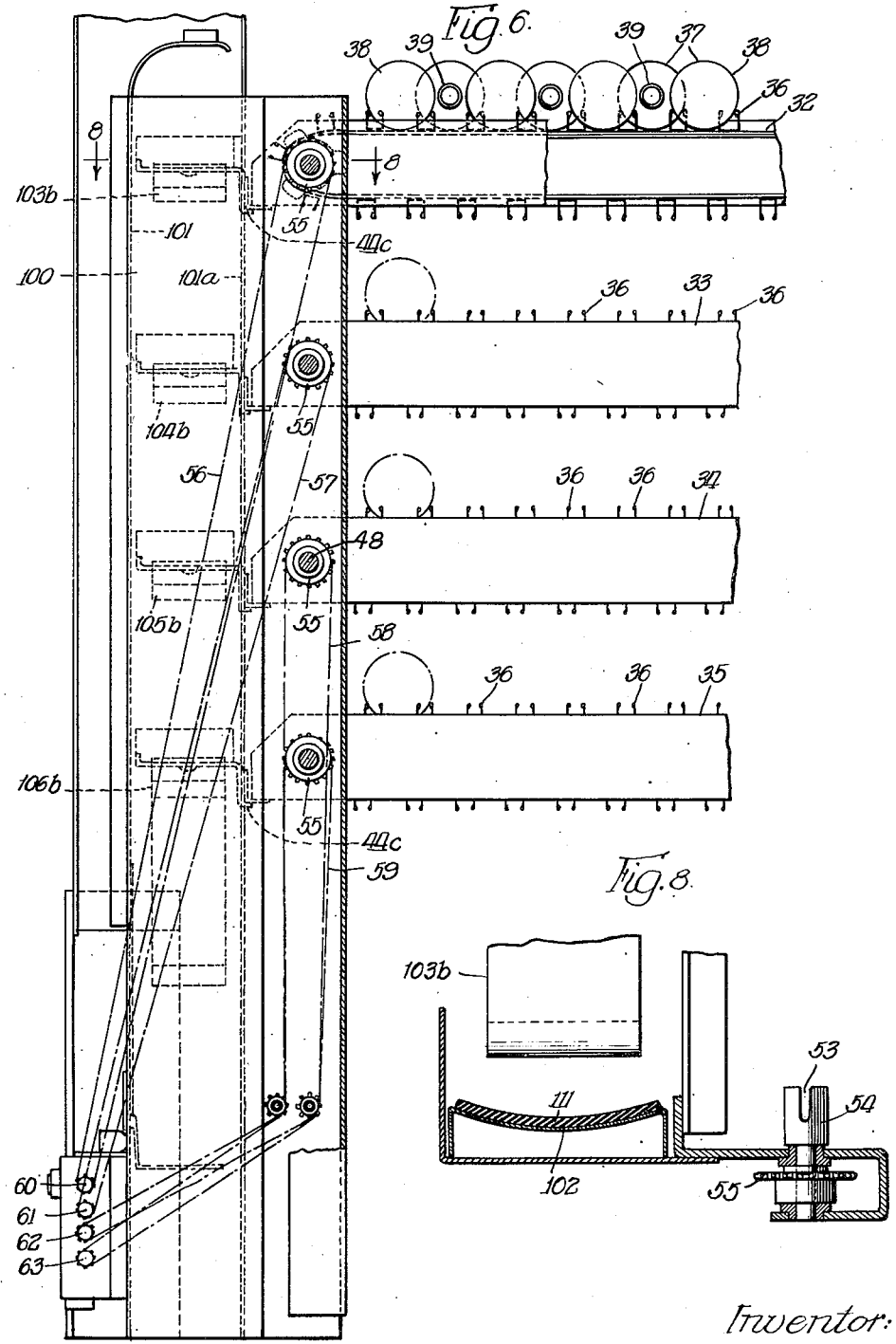
Inventor:
Thomas F. Hamilton
By Wilkinson Huxley, Byron & Knight
attys June 3, 1952  T. F. HAMILTON  2,599,173
DISPENSING APPARATUS
Filed May 3, 1944  10 Sheets-Sheet 8
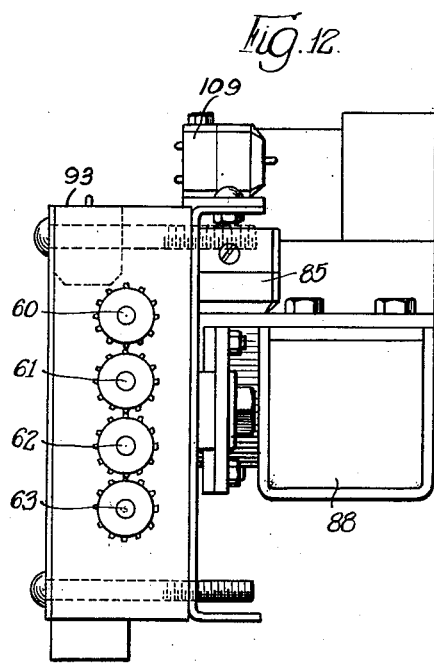
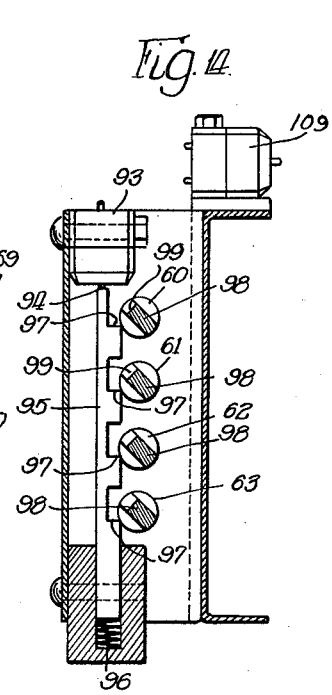
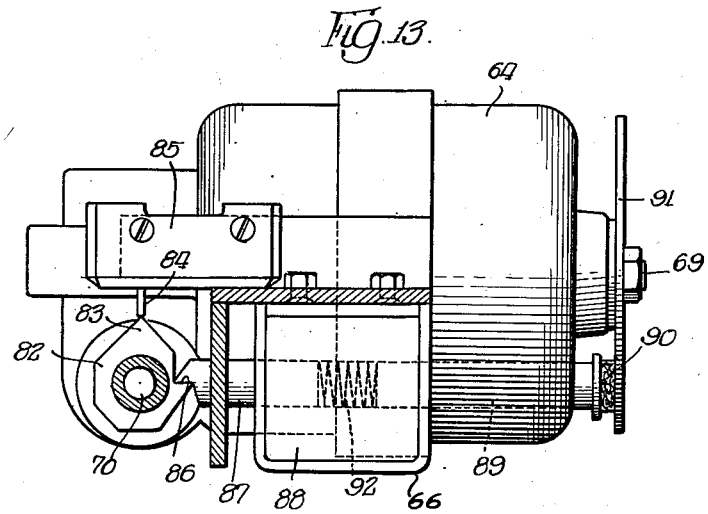
Inventor:
Thomas F. Hamilton,
By Atkinson Huxley, Byron v Knight
Attys June 3, 1952  T. F. HAMILTON  2,599,173
DISPENSING APPARATUS
Filed May 3, 1944  10 Sheets-Sheet 9
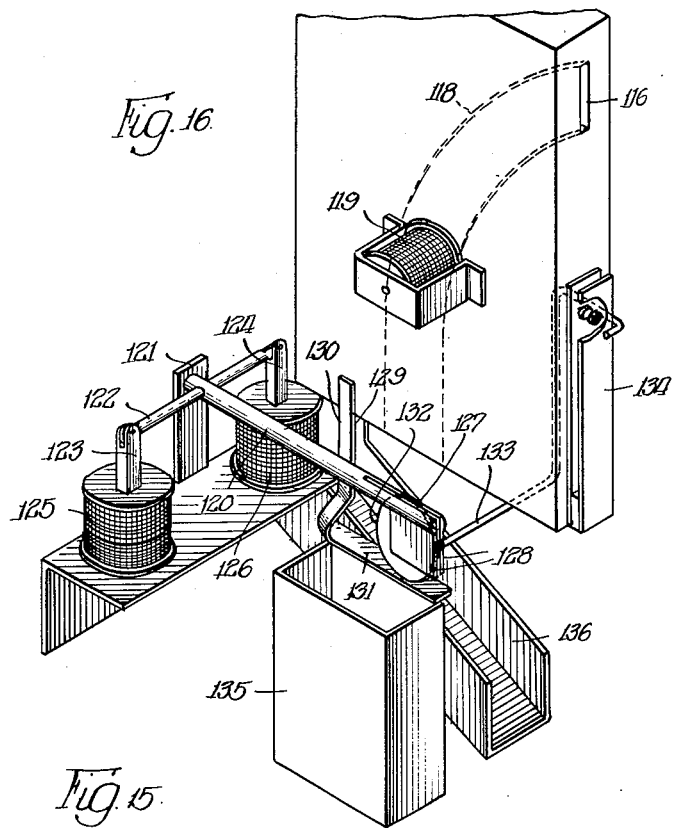
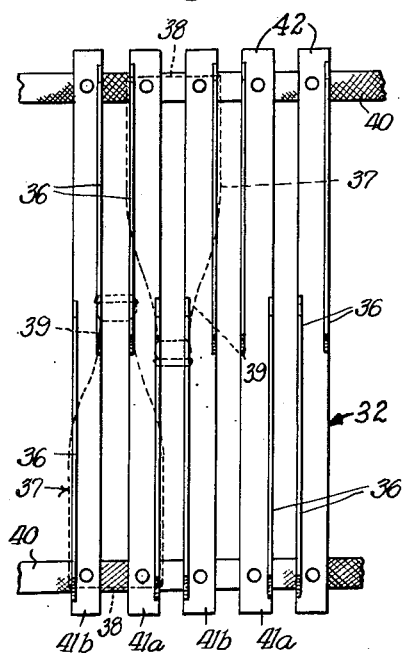
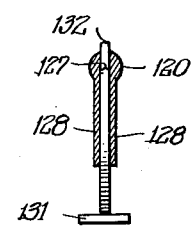
INVENTOR.
Thomas F. Hamilton,
BY June 3, 1952     T. F. HAMILTON     2,599,173
DISPENSING APPARATUS
Filed May 3, 1944            10 Sheets-Sheet 10
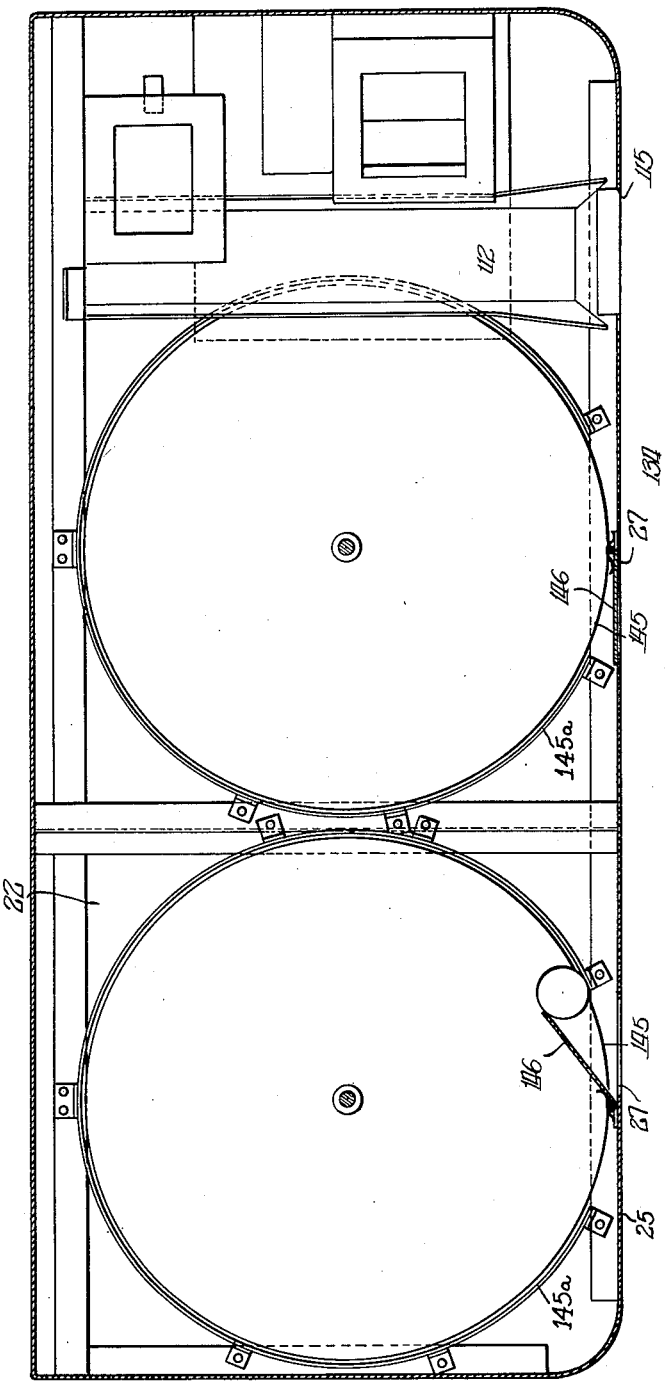
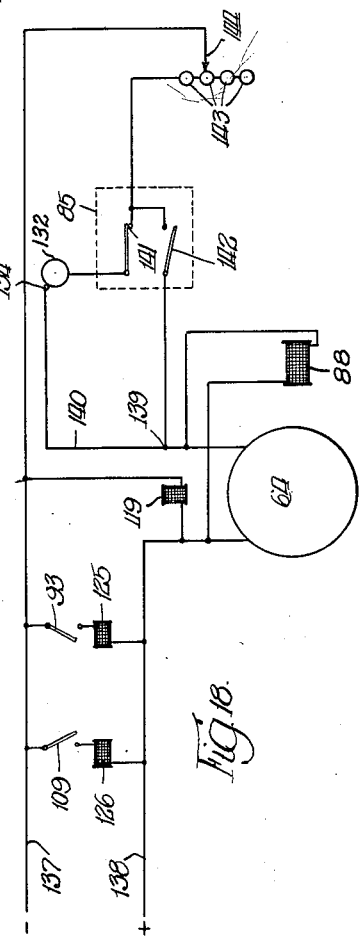
INVENTOR.
Thomas F. Hamilton,
BY Patented June 3, 1952

2,599,173

UNITED STATES PATENT OFFICE 2,599,173

DISPENSING APPARATUS

Thomas F. Hamilton, Chicago, Ill.

Application May 3, 1944, Serial No. 533,829

9 Claims. (Cl. 194—10)

The present invention relates to improvements in dispensing apparatus.

More particularly the present invention relates to apparatus for holding a plurality of bottles or similar articles and for dispensing them in succession when a coin or token is deposited.

An object of the present invention is to provide an improved dispensing apparatus adapted for holding a plurality of kinds or brands of articles, said apparatus providing the customer with the option of selecting any of the different kinds of article contained in said apparatus.

A further object is to provide an improved dispensing apparatus in which bottles or the like may be compactly arranged and efficiently dispensed upon the operation of certain mechanism responsive to the deposition of a coin, token or the like.

A further object is to provide an improved dispensing apparatus in which various types of bottled beverages or the like may be compactly arranged in various groups, said apparatus having the advantage that the customer, through the operation of simple mechanism, may select any one of said bottled beverages and cause the dispensing thereof.

A further object is to provide an improved dispensing apparatus which is simple to load, has a large capacity, and will deliver the bottles or the like with a minimum of shock thereto.

A further object is to provide an improved dispensing apparatus having motive means for causing the delivery of a bottle or the like, which apparatus has the advantage of certainty of action without requiring a powerful motor.

A further object is to provide an improved dispensing apparatus adapted to selectively dispense bottled beverages of different kinds, having coin return mechanism operative to return the customer's coin in the event that the particular bottled beverage which the customer selects has been exhausted.

A further object is to provide an improved dispensing apparatus having simple and sturdy dispensing mechanism which is cheap and sturdy in construction and not likely to get out of order.

A further object is to provide an improved dispensing apparatus which is compact and which affords efficient mechanism for disposing of empty bottles or the like.

A further object is to provide a dispensing apparatus well adapted to meet the needs of such apparatus in every day service.

A further object is to provide an improved dispensing refrigerator which is cheap to construct, has a high capacity for bottles of different brands, is not likely to get out of order, and is simple to operate.

Further objects will appear as the description proceeds.

Referring to the drawings—

Figure 1 is a view in front elevation of one embodiment of the present invention, parts being broken away to show a portion of the interior;

Figure 2 is a sectional view taken along the plane indicated by the arrows 2—2 of Figure 1;

Figure 3 is a sectional view taken along the plane indicated by the arrows 3—3 of Figure 1;

Figure 4 is a sectional view taken along the plane indicated by the arrows 4—4 of Figure 1;

Figure 5 is a view on an enlarged scale of a portion of the structure shown in Figure 2;

Figure 6 is a sectional view taken along the plane indicated by the arrows 6—6 of Figure 5;

Figure 7 is a sectional view taken along the plane indicated by the arrows 7—7 of Figure 3;

Figure 8 represents a detail of construction, said figure being a sectional view taken along the plane indicated by the arrows 8—8 of Figure 6;

Figure 10 is a view in side elevation and Figure 11 is a view in end elevation of a detail of the construction shown in Figure 9;

Figure 12 is a view in end elevation of the structure shown in Figure 9, said view being taken along the plane indicated by the arrows 12—12 of Figure 9;

Figure 13 is a sectional view taken along the plane indicated by the arrows 13—13 of Figure 9;

Figure 14 is a sectional view taken along the plane indicated by the arrows 14—14 of Figure 9;

Figure 15 is a plan view of certain cross members and the belts for operating said cross members, which cross members are adapted to separate and space bottles of any one of the several kinds of bottled beverages in the refrigerator;

Figure 16 is a perspective view of the mechanism for controlling the disposition of the coin or token deposited in the refrigerator by a customer;

Figure 17 shows a detail of construction of the mechanism shown in Figure 16;

Figure 18 is an electrical diagram for use in connection with the mechanism illustrated in the preceding figures; and Figure 19 is a sectional view taken along the plane indicated by the arrows 19—19 of Figure 1.

Figure 9:
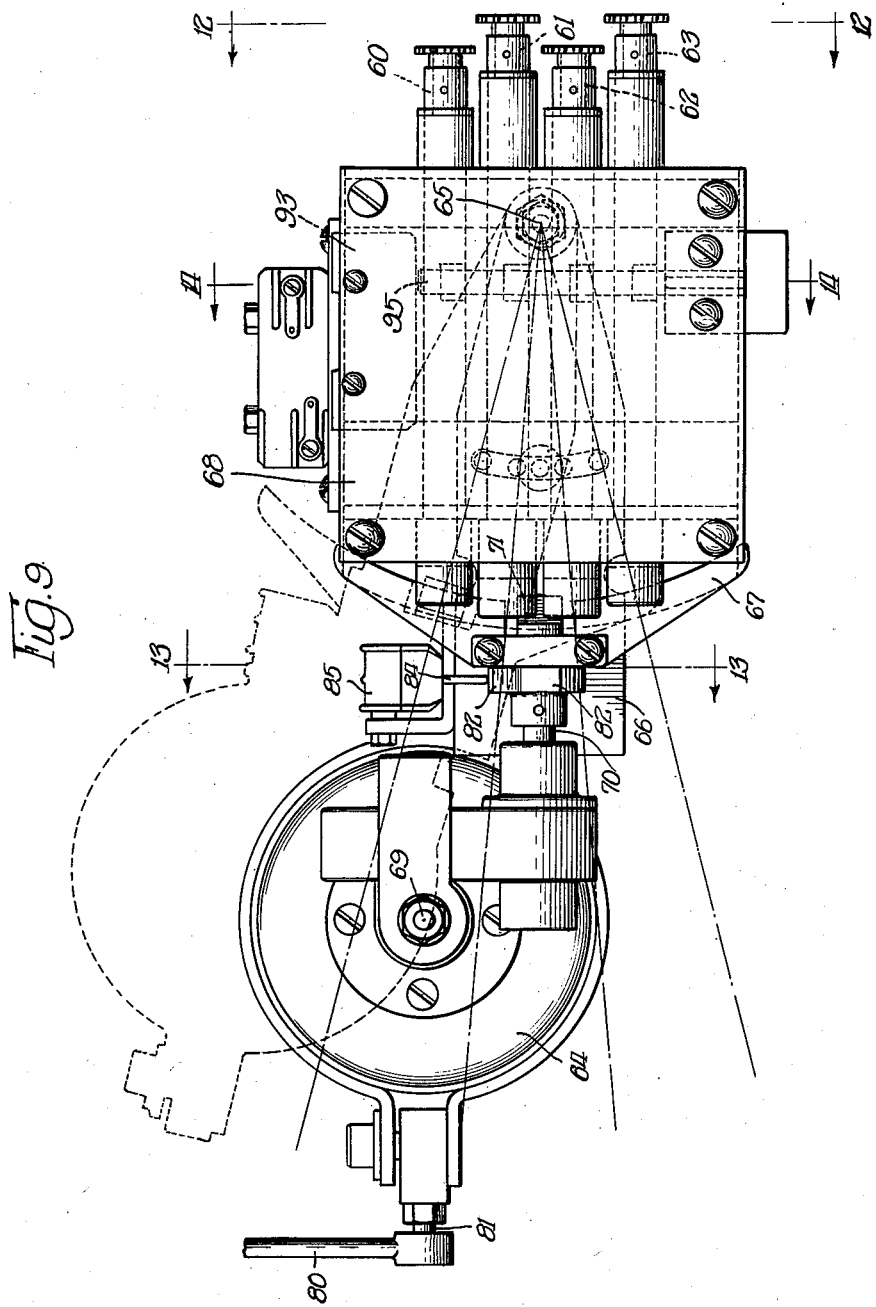
Figure 9 is an enlarged view of a portion of the structure shown in Figure 5.

Referring first to Figures 1 and 2, the numeral 20 indicates the casing of a refrigerator or the like having the upper or refrigerating compartment 21 constituting a refrigerating space for the reception of bottles or other containers to be cooled. Separated from the compartment 21 by the wall 21a (Figure 2) is the compartment 21b for housing certain motive mechanism, to be described presently, for driving the dispensing mechanism. Below the compartments 21 and 21b is a compartment 22 adapted for the reception of empty containers. Below the compartment 22 is the compartment 23 for the reception of a compresser unit and parts associated therewith.

The refrigerating compartment 21 is provided with the doors 24—24 mounted to swing along axes located at the two opposite sides of the casing 20. Said doors 24—24 are controlled by any preferred type of lock.

The compartment 22 adapted to receive empty bottles or the like will be closed at the front by the front wall 25 (Figures 1, 2 and 19), swung about the horizontal axis 26. Said wall 25 is provided with the doors 27—27, to be described presently.

The compartment 23 adjacent to the bottom of casing 20 is provided with the compresser unit 28 connected to the expansion coil 29 (Figures 1 and 2) located in a chamber 30 disposed in said compartment 23. Said chamber 30 is part of an air-circulating system including the conduit 30a leading to the top of the refrigerating compartment 21 and the conduit 30b leading from the compartment 21 into the chamber 30, in which the air is cooled and from which it is again driven up through the conduit 30a, compartment 21 and conduit 30b in a circulatory course. A fan 31 impels said air in its circulatory course.

Located in the refrigerating compartment 21 are a plurality of endless conveyers 32, 33, 34, 35. Each of the conveyers is adapted to carry on the upper side thereof a plurality of bottles or other (elongated) articles lying upon their sides. As shown for example in Figure 6, each conveyer is provided with outstanding dividing members or flanges 36—36, which, as will be explained presently, are so formed that they will compactly hold a plurality of beverage bottles of the usual type, that is, bottles having a body portion of materially greater diameter than the neck portion thereof. Said dividing members or flanges 36 will hold such bottles in positions such that the necks of adjacent bottles will face in opposite directions, so that the neck portion of one bottle pointing in one direction will lie between the neck portions of the two adjacent bottles which point in the opposite direction. In other words, the axes of bottles pointing in one direction will be located intermediate of the axes of the bottles pointing in the opposite direction. Where other articles are to be dispensed, they are stored in alternate staggered relation. A plurality of bottles 37 are indicated in Figure 6, the body portions of said bottles being indicated by the numeral 38, the neck portion being indicated by the numeral 39.

Drive means for the conveyers 32, 33, 34, 35 are provided for selectably driving any of said conveyers in predetermined step by step movements and for stopping each individual conveyer after it has moved through a predetermined step. Mechanism for this purpose will be described presently.

Referring to Figures 3, 7 and 15, the conveyer 32 is illustrated. Inasmuch as the conveyers 32, 33, 34, 35 may be similar in construction, a description of one of said conveyers will suffice for a description of all of them. The conveyer 32 comprises two parallel belts 40—40 which support a plurality of cross members 41a—41b placed parallel to each other and extending transversely of the casing 20 as shown in Figure 3. Said cross members have end portions 42—42 located outside of the boundaries of said belts 40—40. Said cross members are provided with the outstanding dividing members or flanges 36 above mentioned. As will be noted from an inspection of Figures 3 and 15, each of the cross members 41a—41b is an elongated metal member having an outstanding dividing member or flange 36 at one of its side edges adjacent to one extremity of the cross member and another outstanding dividing member or flange 36 at its opposite edge adjacent to the other extremity of said cross member. As shown in Figure 15, the flanges 36—36 adjacent to one belt 40 are located along the right edge of cross member 41a and along the left edge of cross member 41b. The flanges 36—36 adjacent to the other belt 40 are located along the left edge of cross member 41a and along the right edge of cross member 41b. In other words, considering the flanges at either side of adjacent cross members, said flanges are located at opposite edges of the distant ends of said cross members. This construction promotes the staggered relationhip of the bottles 37—37 (or other containers) on the conveyers.

Located interiorly of the conveyer 32 are a pair of belt supports 43 adapted to support the two belts 40—40. Said belt supports 43—43 are supported by cross members 44—44 rigid with the outer frame members 44a connected by end frame members 44b. The frame thus formed by members 44a and 44b is slidably supported on members 44c provided on the casing 20 whereby the frames may be readily removed for assembly or repair. A belt conforming or supporting member 45 may be provided for contacting and supporting the lower surfaces of the belts 40—40 at the lowermost portions of said belts. Said belts 40—40 are trained over pulleys 46—46 located adjacent one end of the casing 20 and over pulleys 47—47 located adjacent the other end of said casing 20. The pulleys 46—46 are connected together by means of the shaft 48 and the pulleys 47—47 are connected together by means of the shift 49.

Located adjacent the extremities of the pulleys 46—46 are sprockets 50—50. As indicated in Figure 7, each of said sprockets has three teeth 51. Said teeth 51 are adapted to engage the extremities 42—42 of the cross members 41a—41b, so that when the sprockets 50 are turned in a counter-clockwise direction as the parts are viewed in Figure 7 the teeth 51—51 of said sprockets will engage the extermities 42—42 of at least one of the cross members 41a—41b to move the belts 40—40 in the direction of the arrows in Figure 7. That is to say, counterclockwise rotation of the sprockets 50—50 will move the bottles 37—37 toward the left as the parts are viewed in Figure 7, that is, to the right as the parts are viewed in Figures 1 and 3.

Each of the conveyers 32, 33, 34, 35 is adapted to be moved in a step by step movement by rotation of a corresponding shaft 48 and its corresponding sprockets 50—50. For the purpose of communicating rotary motion selectively to each of the various shafts 48 associated with the conveyers 32, 33, 34, 35 a pin and slot connection is provided. Referring particularly to Figures 3, 6, 7 and 8, it will be noted that each shaft 48 is provided with a cross pin 52 (Figure 7) adapted to be removably received within a slot 53 (Figure 8) in a stud 54, which studs are rotatably mounted about axes fixed relative to the casing 20. Each of said studs has rigidly connected thereto a sprocket 55. Each of the sprockets 55 is adapted to be connected to its own individual driving spindle by means of a sprocket chain. The various sprocket chains are indicated by the numerals 56 (connected to the sprocket for driving the conveyer 32), 57 (connected to the sprocket for driving the conveyer 33), 58 (connected to the sprocket for driving the conveyer 34) and 59 (connected to the sprocket for driving the conveyer 35). The spindle for driving the sprocket chain 56 is indicated by the numeral 60, the spindle for driving the sprocket chain 57 is indicated by the numeral 61, the spindle for driving the sprocket chain 58 is indicated by the numeral 62 and the spindle for driving the sprocket chain 59 is indicated by the numeral 63, each of said spindles being provided with a sprocket for connection to its corresponding sprocket chain. Said spindles are mounted in bearings stationarily carried with respect to the casing 20.

Said spindles 60, 61, 62, 63 are adapted to be selectively driven by a motor 64. Said motor 64 is mounted to move as an entity in a movement of revolution about the axis 65 (Fig. 9), said motor being mounted on a carriage 66 which includes a crescent-shaped member 67 (Figs. 9, 10 and 11). Said crescent-shaped member as it swings is adapted to have a sliding movement within corner slots in a bracket, indicated as a whole by the numeral 68, which is stationarily mounted with respect to the casing 20 of the refrigerator. The shaft 69 of the motor 64 is connected through the reduction gearing (not illustrated) to the stub shaft 70, which terminates in the cross tongue 71 (Figs. 9, 10 and 11). Said cross tongue 71 has a transverse dimension not greater than the corresponding dimension of the crescent-shaped member 67. By mechanism which will be described presently, the long dimension of the cross tongue 71 when at rest will always be disposed in alignment with the crescent-shaped member 67. The left-hand end (as viewed in Figure 9) of each of said spindles 60, 61, 62 and 63 is provided with a slot adapted to slidably receive the crescent-shaped member 67 and the cross tongue 71. As will appear presently, each of said spindles when at rest has its slot positioned in alignment with the long dimension of the crescent-shaped member 67 and the long dimension of the cross tongue 71. It will be evident that by swinging the carriage 66 about the axis 65, the stub shaft 70 may be brought into cooperative relationship selectively with any one of the spindles 60, 61, 62, 63.

By reason of the construction illustrated and described, rotation of the stub shaft 70 will communicate a movement of rotation to any selected one of the spindles 60, 61, 62, 63, depending upon the angular position of the carriage 66 carrying the motor 64. Consequently, by selecting the angular position of the carriage 66, rotation may be communicated to the corresponding spindle 60, 61, 62, 63, which rotation will communicate movement to the corresponding conveyer 32, 33, 34, 35, respectively.

The means for swinging the carriage 66 with its motor 64 into its various angular positions is illustrated in Figures 2 and 5. Referring particularly to Figure 2, the front wall of the casing 20 is provided with a recess 72 for the reception of a coin-controlled apparatus, indicated as a whole by the numeral 73 (Fig. 2). Said apparatus 73 is presented to the front face of the refrigerator and extends through an aperture 74 provided in the right-hand door 24 as the parts are viewed in Figure 1. Said apparatus 73 fits within the aperture 74 in such a way as to permit the free swinging of said door 24. Extending through said apparatus 73 is the shaft 75 (Figure 2) having at its forward extremity the operating lever 76. The shaft 75 at its other end is provided with gearing, indicated by the numeral 77, adapted to communicate a movement of rotation to the shaft 78. Said shaft 78 is provided with the arm 79, the outer extremity of which is connected to the rod or link 80, which is swingingly connected to a pin 81 (Figure 9) loosely connected to the carriage 66 which carries the motor 64. By moving the lever 76 about the axis of the shaft 75, the motor 64 may be swung to predetermined positions about the axis of swing 65 to position the stub shaft 70 for cooperative relationship with any selected one of the spindles 60, 61, 62, 63.

Mounted upon the stub shaft 70 of the motor 64 is a cam 82 (Figs. 9 and 13). Said cam 82 has a raised portion 83 adapted to control a pin 84 which forms part of a two-way switch 85, the functions of which will be described presently. Said cam 82 is also provided with a notched portion providing the shoulder 86 adapted to be engaged by the extremity of a detent member 87. Said detent member 87 is the armature of a solenoid 88, which will be referred to herein as a brake and detent solenoid. Also responsive to the solenoid 88 is the armature 89 (Figures 12 and 13), which carries at its outer extremity the brake shoe 90 adapted to cooperate with a brake disk 91 fast on the shaft 69 of the motor 64. The armatures 87 and 89 of the solenoid 88 are urged outwardly in opposite directions by means of the spring 92, so that the extremity of the armature 87 will be in stopping relationship with the cam 82 on the stub shaft 70 and the brake shoe of the armature 89 will be in braking relationship with the brake disk 91 of the shaft of the motor 64. Through electrical connections, which will be described presently, the solenoid 88 may be energized to draw inwardly its armatures 87 and 89 whereby to release the detent 87 from the cam 82 and stub shaft 70 and to release the brake shoe 90 from the disk 91 on shaft of the motor 64. When said solenoid 88 is deenergized, the detent 87 will prevent the cam 82 from moving in a counter-clockwise direction as the parts are viewed in Figure 13, and in this position the raised portion 83 of said cam 82 will engage the pin 84 of the two-way switch 85, whereby the parts will be positioned for operation when a coin or token is deposited in the token-responsive apparatus 73, as will be described presently. At this time also, that is—when the solenoid 88 is deenergized, the brake shoe 90 will prevent rotation of the shaft 69 of the motor 64.

The present invention has provision for the return of a coin or token in the event that a bottle has not been delivered before the termination of a certain amount of rotation of a spindle 60, 61, 62 or 63. Figures 12, 14 and 18 show a coin return switch 93 which is normally open but which is closed during a portion of the rotation of the motor shaft 69 and the accompanying rotation of the particular spindle 60, 61, 62, 63 which is connected to said motor shaft.

As shown in Figure 14, the coin return switch 93 is provided with the movable pin 94. Said pin 94 is normally held upwardly by the rack 95, which is biased upwardly by the spring 96. Said rack 95 is provided with the shoulders 97—97 adapted to be engaged by a portion of the particular spindle 60, 61, 62, 63 which is being rotated by the motor 64. By reference to Figures 9 and 14, it will be noted that each of said spindles is cut away at the region thereof adjacent to the rack 95 to leave a diametrical neck portion 98. One extremity of said neck portion extends to the circumference of its corresponding spindle. The other end of said neck portion 98, however, stops short of the circumference of its corresponding spindle as indicated by the numerals 99—99. Each neck portion 98 when rotated in a counterclockwise direction as the parts are viewed in Figure 14 is adapted to rotate for approximately three-fourths of a revolution from the position indicated in Figure 14 before engaging a shoulder 97 of the rack 95. Engagement of the neck portion 98 of any of the spindles with its corresponding shoulder 97 will result in the lowering of the rack 95, causing the closure of the coin return switch 93. The period of closure of said coin return switch 93 will continue until said neck portion 98 clears its corresponding shoulder 97, after which the rack 95 will be returned to its uppermost position, returning the coin control switch 93 to its normally open position.

As will be explained when the mode of operation of the structure is described, the present invention provides mechanism whereby after a customer has preselected the angular position of the motor 64 (Fig. 9), putting said motor into driving relationship with a selected one of the spindles 60, 61, 62, 63, and has deposited a coin or token into the apparatus, the conveyer 32, 33, 34, 35, connected respectively to a spindle 60, 61, 62, 63, will be moved through a predetermined step to move a bottle toward the left as the parts are viewed in Figures 6 and 7, that is—toward the right as the parts are viewed in Figures 1 and 3, the end of said step being determined by the deenergization of the motor 64 and the application of the brake shoe 90 to the brake disk 91 (Fig. 13). The step of movement of the particular conveyer 32, 33, 34, 35 to move its load of bottles to the left as the parts are viewed in Figures 6 and 7 causes the dropping of one of said bottles into a chute, indicated by the numeral 100, defined by the two side walls 101 and 101a (Figs. 1, 3 and 6) and end walls 102 (Fig. 8). As noted above, the body portion 38 of one bottle is disposed in one direction and the body portion of the next adjacent bottle is disposed in the opposite direction as shown in Figures 6, 7 and 15. Disposed in the chute 100 are a plurality of spring brakes 103, 104, 105, 106 positioned to receive bottles discharged respectively from the conveyers 32, 33, 34, 35. Each of said spring brakes 103, 104, 105, 106 is a leaf spring extending across the chute 100, each of said leaf springs being supported at its middle whereby to form, in effect, two cantilever springs bowed downwardly from the middle. Said cantilever springs are indicated in Figure 5 by the reference numerals 103a, 103b, 104a, 104b, 105a, 105b and 106a and 106b. A bottle deposited upon the spring 103a or 103b of the uppermost spring brake 103 will bow that particular spring downwardly to permit the passage of the bottle deposited thereon, turning it into a vertical position, bottom down, and the springs below it will bow and permit the passage of said bottle. Bottles passing the springs 103a, 104a, 105a, 106a will gravitate to the downwardly sloping wall 107 (Fig. 4) to the downwardly directed chute 108 (Fig. 4). Bottles passing the springs 103b, 104b, 105b, 106b will gravitate more or less directly to said chute 108. Located in said chute 108 is the coin collector switch 109 located in a position to be operated by a bottle passing down through the chute 108. Said switch 109 is biased to open position and is closed while a bottle is passing said switch downwardly through the chute 108. Located at the bottom of the chute 108 is the trap door 110 (Figure 4) biased to closed position to minimize the escape of cooled air from the compartment 21.

The end walls 102 of the chute 100 are of arcuate shape to conform to the usual cylindrical surface of bottles and are provided with cushioning members 111. As bottles pass the springs 103a, 104a, 105a, 106a or 103b, 104b, 105b, 106b they will be turned from horizontal position into a vertical position and will be delivered downwardly through the chute 108 in a vertical position. Below the trap door 110 is an inclined chute 112 (Figure 4). Said chute 112 adjacent to its lower end is provided with a downwardly curved portion 113 and is provided at its end with an inclined wall 114 which locates the bottle in a position inclined to the vertical as illustrated in Figure 4. The casing of the refrigerator is provided with a window 115 through which the bottle may be removed.

Figure 16 illustrates mechanism for the handling of a coin or token after it has been deposited into the refrigerator, determining whether said coin or token should be rejected because spurious or for some other reason, or whether said token should be returned to the customer for the reason that there was no bottle in the refrigerator in the group selected by the customer, or whether the token should be deposited in a coin collector box.

Referring first to Figure 1, the token responsive apparatus 73 is provided with the coin receiving slot 116 and a coin return cup 117.

Referring now to Figure 16, the numeral 118 indicates a conduit for the passage of a coin or token deposited into the slot 116. The coin in passing through the conduit 118 will pass the rejector mechanism 119. Said rejector mechanism is not illustrated in detail and need not be described in detail for the reason that rejector mechanism for detecting and rejecting spurious coins is well known to those skilled in the art and readily available in the market. A coin or token rejected by the mechanism 119 may be delivered to the return cup 117 or to some other receptacle through a conduit which need not be described herein inasmuch as it forms no part of the present invention.

Disposed in the path of a coin descending through the conduit 118 is the rocking arm 120 mounted in the upstanding plate 121. Extending from the two sides of said rocking arm 120 are the two extremities of a bar 122, said two extremities being connected to the armatures 123 and 124 responsive respectively to the solenoids 125 and 126. Located in the outer extremity of the rocking arm 120 is a slot 127. Depending from said rocking arm 120 are the spaced wings 128—128. Said slot 127 and the spaced wings 128—128 are adapted to receive a coin dropped through the conduit 118. Said rocking arm 120 is biased to a mid-position in which the wings 128—128 are vertically disposed. The numeral 129 indicates a fixedly mounted bracket having the vertical arm 130 and the horizontal arm 131. When the rocking arm 120 is in its mid-position, a coin, indicated by the numeral 132, will rest upon the horizontal arm 131. Disposed in position to contact the edge of a coin 132 located between the wings 128—128 and resting upon the horizontal arm 131 is the lever 133, which controls a coin switch indicated as a whole by the numeral 134. The details of the coin switch need not be described herein inasmuch as coin switches suitable for the purpose are readily available. It is sufficient to say that when there is no coin in the space between the wings 128—128 said coin switch 134 will be open. However, when a coin 132 is located between the wings 128—128, said coin, by reason of its engagement with the lever 133, will hold said switch 134 in closed position.

Disposed upon one side of the horizontal arm 131 of the bracket 129 is the coin collector box 135, and located upon the other side of said arm 131 is the coin return chute 136. When the solenoid 126 is energized to rock the arm 120 and the wings 128 toward the coin collector box 135, the coin 132 will be moved past the arm 131 whereby said coin will drop into said coin collector box 135. On the other hand, if the coin return solenoid 125 is energized to rock the arm 120 toward the coin return chute 136, the coin 132 will drop into said chute 136 to be returned to the coin return cup 117 (Fig. 1).

The electrical circuits for causing operation of the instrumentalities above described is illustrated diagrammatically in Figure 18, in which the numerals 137, 138 indicate the two wires of an electric circuit. Connected across the wires 137, 138 is the bottle-operated switch 109 biased to open position but closed momentarily when a bottle passes down through a chute 108 (Fig. 4). Said switch 109 is in circuit with the solenoid 126 (Fig. 16). Also connected across the wires 137, 138 is the circuit including the coin return switch 93 and the solenoid 125. Connected continuously across the wires 137, 138 is the solenoid of the token rejector mechanism 119.

The motor 64 has one of its terminals connected to the wire 138 and the other of its terminals connected to the binding post 139. Circuit may be traced from the binding post 139 through two paths, (a) the conductor 140, the coin responsive switch 134, the normally closed contacts 141 of the two-way switch 85 to the set of contacts 143, and (b) through the normally open contacts 142 of the two-way switch 85 to the set of contacts 143. The brake and detent solenoid 88 is connected across the terminals of the motor 64. A swinging contact 144 moves with the swinging motor 64, so that circuit through said motor is completed only when said motor is in position to have driving relationship with one of the conveyers 32, 33, 34, 35.

Referring now to Figures 1 and 19, mechanism is provided for receiving and storing empty bottles. Located in the compartment 22 are a pair of turntables 145—145 mounted to rotate about vertical axes. The doorways 27—27 are located symmetrically in front of said turntables, which doorways 27—27 as well as the doorway 115 are located in the front wall 25 which closes the compartment 22. Each of the doorways 27 is adapted to be closed by a swinging door 146 (Figs. 1 and 19). Disposed adjacent each of said turntables there is provided a low peripheral wall or guard rail 145a, which is open to permit swinging movement of the adjacent door 27 when a bottle is inserted therethrough, said rails 145a being fixed in the casing. Each of said doors 146 is spring-pressed to closed position. The function of each door 146 is not only to provide a closure for the corresponding open doorway 27 but also to provide motive means for rotating the corresponding turntable 145 when an empty bottle is placed upon said turntable. It will be observed that when a door 146 is pushed inwardly by a bottle, the swinging edge of said door will in its closing movement communicate a moment of force to the bottle, urging said bottle toward the right as the parts are viewed in Figures 1 and 19. The bottle, by reason of its engagement with the turntable 145 and by reason of its engagement with the next adjacent bottle in a counter-clockwise direction as the parts are viewed in Figure 19, will turn the corresponding turntable 145 in a counter-clockwise direction until the swinging door 146 can clear the bottle last introduced and return to its closed position.

The mode of operation of the above described embodiment of the present invention is substantially as follows:

In loading the casing 20 the service man will swing open the doors 24—24 and will load bottles upon the various conveyers 32, 33, 34, 35 nesting said bottles with the necks of adjacent bottles facing in opposite directions in the manner illustrated in Figures 6, 7 and 15. The brands of the bottles on the various conveyers may be different, so that a plurality of brands may be selectably dispensed by the apparatus. The service man will have access to the compartment 22 whereby to remove any empty bottles that are located therein, said access being had by swinging the front wall 25 forwardly. After bottles have been loaded upon said conveyers the doors 24—24 will be closed and locked. Refrigerated air will be delivered from the fan 31 past the cooling coil 29 (Figures 1 and 2) through the conduit 30a to the top of the refrigerator and thence downwardly through the storage compartment 21 and conduit 30b back to the fan 31.

A customer may preselect the brand of bottle that he desires by moving the lever 76 on the front of the apparatus (Figures 1 and 5). As shown in Figure 2, movement of the lever 76 will cause rotation of the shaft 75, adjusting the axial position of the carriage 66 carrying the motor 64. As illustrated in Figure 9, the axial adjustment of the carriage 66 about the axis 65 will bring the tongue 71 into cooperative relationship with one or another of the spindles 60, 61, 62, 63, which spindles are connected, respectively, in driving relationship with the conveyers 32, 33, 34, 35. After the customer has positioned the lever 76 to provide an operative connection between the motor 64 and the conveyer bearing the particular brand of bottled beverage that the customer desires, the customer will deposit a coin in the coin slot 116. Said coin will travel down through the chute 118 past the coin rejector mechanism 119. If said coin should be spurious it will be rejected and delivered either to the coin return cup 117 or to some other receptacle (not illustrated).

If the coin has successfully passed the coin rejecting mechanism 119 it will be delivered to the slot 127 in the rocking arm 120 and will come to rest upon the arm 131 of the bracket 129, being located between the spaced wings 128—128 which depend from the rocking arm 120. The presence of a coin (indicated by the numeral 132 in Fig. 16) will result in the closure of the coin switch 134. By reference to Figure 18 it will be noted that closure of the coin switch 134 completes a circuit from the wire 138 through the motor 64, through the coin switch 134 and the normally closed contacts 141 of the two-way switch 85 to one of the contacts 143 and thence through the contact 144 to the wire 137. Unless the motor 64 has been swung to the correct position to have driving relationship with one of the conveyers 32, 33, 34 or 35, the contact 144 will not engage one of the contacts 143 and the motor 64 will not start. The customer will thus be put on notice to adjust the lever 76. Any well known means may be utilized to pilot said lever 76 into any selected position after it has been moved into adjacency thereto. Completion of the circuit last traced will have two results, one being to energize the brake and detent solenoid 88 (Figs. 13 and 18), withdrawing the detent 87 (Figure 13) from the cam 82 and withdrawing the brake shoe 90 from the brake disk 91 of the motor 64. Completion of said circuit will also have the result of energizing the motor 64. Said motor will therefore be set into operation, rotating the cam 82 located upon the stub shaft 70, thereby releasing the pin 84 of the two-way switch 85 (Fig. 13), opening the normally closed contacts 141 thereof and closing the normally open contacts 142 thereof (Fig. 18). Rotation of said motor 64 will result in the rotation of the particular spindle 60, 61, 62, 63 (Fig. 9) with which it has driving relationship, communicating a driving movement to the corresponding conveyer 32, 33, 34, 35, carrying the bottles thereon toward the left as the parts are viewed in Figures 6 and 7—that is, toward the right as the parts are viewed in Figures 1 and 3. The pitch diameters of the sprockets carried by the spindles 60, 61, 62, 63 will be so related to the corresponding sprockets 55 associated with the respective conveyers 32, 33, 34, 35 that the amount of rotation communicated to one of the spindles referred to will move the corresponding conveyer a sufficient distance to cause one bottle to fall away from that particular conveyer into the chute 100. Rotation of the particular spindle set in motion by rotation of the motor 64 will cause movement of the neck portion 98 of that particular spindle, the rotation starting from the positions illustrated in Figure 14 and proceeding in a counter-clockwise direction. After the neck portion 98 of the particular spindle set into rotation has engaged its corresponding shoulder 97 of the rack 95 it will move said rack 95 downwardly, allowing the pin 94 of the coin return switch 93 to drop, closing said switch 93. The period of time required for the particular neck portion 98 of a rotating spindle to reach and push down a shoulder 97 of the rack 95 will be amply sufficient to permit a bottle deposited from a conveyer 32, 33, 34 or 35 to gravitate past the coin collector switch 109, closing said switch prior to close of switch 93. Consequently, under normal operation the coin collector switch 109 will be closed and will energize the solenoid 126 (Figs. 16 and 18), causing the rocking of the arm 120 to move the coin 132 past the stationary arm 131, allowing it to drop into the coin collector box 135. The particular spindle 60, 61, 62, 63 connected to the motor 64 will continue its rotation until the high spot 83 of the cam 82 reaches the position to raise the pin 84 (Fig. 13), which will restore the two-way switch to its normal position in which the normally closed contacts 141 are in engagement with and the normally open contacts 142 are disengaged. Since at this instant there is no coin in position to close the switch 134, the motor will be deenergized and at the same instant the brake and detent solenoid 88 will be deenergized, whereby the detent 87 will be moved to the left as the parts are viewed in Figure 13, effectually stopping any further forward movement of the stub shaft 70 of the motor 64. The armature 89 will at the same instant be moved to the right, bringing the brake shoe 90 into braking relationship with the brake disk 91 of the motor 64. With the motor shaft stopped in the position just described, the tongue 71 will be disposed in alignment with the long dimension of the crescent-shaped member 67, whereby the carriage 66 carrying the motor 64 and the crescent-shaped member 67 may be swung about the axis 65 at the option of the customer to position the tongue 71 in cooperative relationship with any of the spindles 60, 61, 62 and 63.

In the event that the supply of bottles should have been exhausted from the particular conveyer chosen by the customer, the following action will occur: After the customer has deposited a coin in the coin receiving slot 116 said coin will take its course down through the conduit 118 past the coin rejecting mechanism 119 into the slot 127 in the rocking arm 120, coming to rest upon the stationary arm 131 of the bracket 129 and moving the coin switch 134 to closed position. This will energize the motor 64 as above described, and will also energize the brake and detent solenoid 88, whereby (Fig. 13) the detent 87 will be withdrawn from the shoulder 86 of the cam 82 and the brake shoe 90 will be drawn out of braking relationship with the brake disk 91 of the motor 64. The motor 64 will be set into rotation rotating the stub shaft 70 and the cam 82 in a counter-clockwise direction as the parts are viewed in Figure 13. The particular spindle 60, 61, 62, 63 connected to the motor 64 will rotate in a counter-clockwise direction as the parts are viewed in Figure 14, whereby the portion 98 thereof will, after about three-fourths of a revolution, engage a shoulder 97 of the rack 95, pushing said rack downwardly to allow the normally open coin return switch 93 to close, resulting in the energization of the solenoid 125 (Figs. 16 and 18), rocking the arm 120 toward the coin return chute 136, whereby the coin disposed therein will become free from the stationary arm 131 and will drop into said chute 136, whence it will gravitate to the coin return cup 117. The motor 64 will continue to operate until the cam 82 reaches the position shown in Figure 13, in which the pin 84 is raised, operating the two-way switch 85 to restore the switch contacts 142 to their normally open position and restoring the normally closed contacts 141 to their closed position. At this time the brake and detent solenoid is also deenergized, as above described, whereby the detent 87 is moved to obstructing relationship with the cam 82 to prevent further forward rotation thereof and the brake shoe 90 is moved into braking relationship with the brake disk 91 to effectually stop the drift of the motor 64.

After a customer has emptied a bottle which he has received from the apparatus, as above described, he will dispose of said bottle by thrusting it into either one of the doorways 27 of the dead storage compartment 22. The customer will put the bottle within the perimeter of the corresponding turntable 145, and the corresponding door 146, in closing under the influence of its spring, will engage the bottle, exerting a push thereon having a component in a direction circumferentially of the turntable 145, moving said turntable in a counter-clockwise direction as the parts are viewed Figure 19. The corresponding door 146 will be swung shut, and the empty bottles will therefore be out of sight.

Though a preferred embodiment of the present invention has been described in detail, many modifications will occur to those skilled in the art. It is intended to cover all such modifications that fall within the scope of the appended claims.

What is claimed is:

1. In a device of the character described, a plurality of endless conveyers each having dividing means for separating articles to be dispensed, motive means, separate drive means for each conveyer, means for movably mounting said motive means to selectively engage the motive means to any one of said drive means, means for definitely stopping said motive means after a predetermined step of movement of said motive means, and coin-controlled mechanism for controlling energization of said motive means and for releasing said stopping means at the start of said step of movement.

2. In combination, in dispensing apparatus, a plurality of endless conveyers each having driving means and dividing means for separating articles to be dispensed, an electric motor and means for moving said motor to place it in driving relationship selectably with any of said conveyer driving means, means for definitely stopping said motor after said motor has driven a conveyer throughout a definite step of movement, and coin-controlled mechanism for controlling energization of said motor and for releasing said stopping means at the start of said step of movement.

3. In combination, in dispensing apparatus, a plurality of endless conveyers each having driving means and dividing means for separating articles to be dispensed, an electric motor, carrying means for said motor, said carrying means being swingingly mounted and adapted to place said motor in cooperative relationship selectably with any of said conveyer driving means, and coin-controlled mechanism for controlling energization of said motor to communicate a definite step of movement to the particular conveyer with which it is in cooperative relationship.

4. In combination, in dispensing apparatus, a plurality of endless conveyers each having dividing means for separating articles to be dispensed, an electrical motor, means for swingingly supporting said motor and for guiding movement of said motor in a single plane, a plurality of spindles each connected with a corresponding one of said conveyers, said motor having a shaft adapted to be positioned in driving relationship selectably with any one of said spindles, and coin-controlled mechanism for controlling energization of said motor and for insuring that said motor shaft is stopped after each energization at a predetermined point in its rotation.

5. In dispensing apparatus, in combination, an endless conveyer, means for definitely separating articles to be dispensed from said conveyer, an electric motor adapted to be connected to said conveyer, a brake for said motor, a cam adapted to be positively rotated by said motor, a detent for definitely stopping rotation of said cam, electromagnetic means for controlling said brake and said detent, a two-way switch having a pair of normally closed contacts and a pair of normally open contacts, a coin controlled switch for energizing said motor and said electromagnetic means through said normally closed contacts, said cam being operative to open said normally closed contacts and to close said normally open contacts to continue energization of the motor, coin return mechanism operative by said motor after a predetermined movement of said conveyer to return a coin to a region accessible from the outside of said apparatus, and coin collector mechanism responsive to the passage of one of said articles to be dispensed, said coin return mechanism and said coin collector mechanism having a timed relationship whereby said coin collector mechanism will operate prior to the operation of said coin return mechanism after each energization of said motor in the event that an article has been dispensed.

6. In a device of the character described, the combination of a casing, a plurality of frames slidably mounted in said casing and readily removable therefrom, each frame having an endless conveyer thereon for supporting articles to be dispensed, dispensing means for operating the selected conveyer for dispensing articles from the selected frame, interlock means for rendering the conveyers of non-selected frames immovable during dispensing from the selected frame, and a readily disconnectable driving connection between said dispensing means and the conveyer of each frame for moving said conveyers a predetermined amount.

7. A conveying device for articles to be dispensed comprising a frame, shafts supported by said frame, a pair of spaced belts disposed as an endless conveyer driven by one of said shafts, and supporting means for said articles disposed between and secured to said belts, said supporting means comprising a plurality of cleats, said cleats having an upstanding flange along each edge and extending partway of the length of the cleat, the flanges of adjacent cleats being adjacent each other in pairs whereby adjacent articles to be dispensed are arranged in staggered relation to each other.

8. A conveying device for articles to be dispensed comprising a frame, shafts supported by said frame, sprockets on said shafts, a pair of spaced belts disposed as an endless conveyer driven by one of said shafts, and supporting means for said articles disposed between and secured to said belts, said supporting means comprising a plurality of cleats, said cleats having an upstanding flange along each edge and extending partway of the length of the cleat, the flanges of adjacent cleats being adjacent each other in pairs, the ends of the cleats being flattened and extending beyond said belts to form sprocket engaging members.

9. A conveying device for articles to be dispensed comprising a frame, shafts supported by said frame, sprockets on said shafts, a pair of spaced belts disposed as an endless conveyer driven by one of said shafts, and supporting means for said articles disposed between and secured to belts, said supporting means comprising a plurality of cleats, said cleats having an upstanding flange along each edge and extending partway of the length of the cleat, the flanges of adjacent cleats being adjacent each other in pairs, the ends of the cleats being flattened and extending beyond said belts to form sprocket engaging members, the frame having supporting means for said belts, said means comprising supporting members above said shafts engaged by the under sides of said cleats, and supporting members below said shafts engaged by the opposite sides of said cleats, the last named supporting members engaging the ends of said cleats.

THOMAS F. HAMILTON.

(References on following page)

REFERENCES CITED

The following references are of record in the file of this patent:

UNITED STATES PATENTS

| Number | Name | Date |
|---|---|---|
| 416,827 | Corbett | Dec. 10, 1889 |
| 919,824 | Chisholm | Apr. 27, 1909 |
| 923,132 | Bishop | June 1, 1909 |
| 948,914 | Arnold | Feb. 8, 1910 |
| 1,032,989 | Cawley | July 16, 1912 |
| 1,108,163 | Frick | Aug. 25, 1914 |
| 1,125,037 | Bachman | Jan. 19, 1915 |
| 1,174,369 | Walsh | Mar. 7, 1916 |
| 1,174,754 | Mioton | Mar. 7, 1916 |
| 1,193,027 | Korud | Aug. 1, 1916 |
| 1,298,848 | Wineberg | Apr. 1, 1919 |
| 1,446,010 | Holland | Feb. 20, 1923 |
| 1,464,578 | Morton | Aug. 14, 1923 |
| 1,478,590 | Tamborello | Dec. 25, 1923 |
| 1,483,777 | Callahan | Feb. 12, 1924 |
| 1,619,006 | Vaughan | Mar. 1, 1927 |
| 1,655,090 | Cunningham | Jan. 3, 1928 |
| 1,700,277 | Baker | Jan. 29, 1929 |
| 1,723,081 | Schantz | Aug. 6, 1929 |
| 1,998,602 | Anderson | Apr. 23, 1935 |
| 2,004,418 | Radtke | June 11, 1935 |
| 2,059,063 | Tourville | Oct. 27, 1936 |
| 2,137,031 | Smith | Nov. 15, 1938 |
| 2,154,147 | Bensemann | Apr. 11, 1939 |
| 2,180,639 | McMahon et al. | Nov. 21, 1939 |
| 2,187,233 | Garner | Jan. 16, 1940 |
| 2,189,740 | Mills | Feb. 6, 1940 |
| 2,237,712 | Mullins | Apr. 8, 1941 |
| 2,239,176 | Waitzman | Apr. 22, 1941 |
| 2,249,236 | Tratsch | July 15, 1941 |
| 2,266,025 | Grau | Dec. 16, 1941 |
| 2,271,284 | Baxter et al. | Jan. 27, 1942 |
| 2,272,750 | Miller | Feb. 10, 1942 |
| 2,280,323 | Tone | Apr. 21, 1942 |
| 2,323,517 | Clem | July 6, 1943 |
| 2,330,186 | Jetseck et al. | Sept. 21, 1943 |
| 2,354,896 | Weiler | Aug. 1, 1944 |
| 2,359,183 | Wilsey | Sept. 26, 1944 |
| 2,379,112 | Stewart | June 26, 1945 |
| 2,392,511 | Thompson et al. | Jan. 8, 1946 |
| 2,393,370 | Hamilton | Jan. 22, 1946 |

FOREIGN PATENTS

| Number | Country | Date |
|---|---|---|
| 163,825 | Great Britain | June 1, 1921 |
| 335,914 | Great Britain | Sept. 29, 1930 |
| 353,428 | Great Britain | July 14, 1941 |